United States Patent [19]
Mackey et al.

[11] 3,869,402
[45] Mar. 4, 1975

[54] METHOD FOR MAKING ANTIHALATION LAYER

[75] Inventors: E. Scudder Mackey; Albert J. Neschleba, both of Binghamton, N.Y.

[73] Assignee: GAF Corporation, New York, N.Y.

[22] Filed: July 5, 1972

[21] Appl. No.: 269,059

[52] U.S. Cl. .............................. 252/300, 96/84 R
[51] Int. Cl. ................................................ G03c 1/84
[58] Field of Search ..................... 96/84 M; 252/300

[56] References Cited
UNITED STATES PATENTS
3,627,694  12/1971  Mackey .................................. 96/84
3,755,186  8/1973  Hine ....................................... 96/84

*Primary Examiner*—Ronald H. Smith
*Attorney, Agent, or Firm*—Walter C. Kehm; Samson B. Leavitt

[57] ABSTRACT

Pyrolusite-containing photographic anti-halation layers are prepared by reduction of potassium permanganate with hydroxyl containing organic compounds containing a high ratio of oxygen to carbon and preferably polyols having an oxygen to carbon ratio of greater than 1:2.

8 Claims, No Drawings

METHOD FOR MAKING ANTIHALATION LAYER

This invention relates to the manufacture of antihalation layers for photographic film and more particularly, to the manufacture of such layers from pyrolusite.

The use of pyrolusite or manganese dioxide for the manufacture of anti-halation layers is extremely well known and various processes have been suggested for achieving the proper particle size and color of the pyrolusite for anti-halation use. One such process involved reducing potassium permanganate with an alcohol in an aqueous solution and thereafter milling or grinding the manganese dioxide pigment (pyrolusite) and subsequently redispersing it in a colloid. Another method involved reacting potassium permanganate with gelatin wherein gelatin served both as the reducing agent and the suspending agent. Still another employed polyvinyl alcohol as a reducing agent for the permanganate and as the suspending agent for the colloidal manganese dioxide produced by such reduction.

All of the processes were attended by certain disadvantages which mitigated against their commercialization. Thus, the technique of using alcohol as a reducing agent followed by grinding of the pigment led to particles of uneven size and distribution. On the other hand, the use of polyvinyl alcohol resulted in a product which after ageing showed residual yellow stain thereby rendering it undesirable for most applications. The practice of using gelatin as the reducing and suspending agent gives rise to many problems such as embrittling the gel, either as a result of reaction with the potassium permanganate, or with excess salts. Additionally, this technique does not produce particles of manganese dioxide of uniform size but tends rather to yield undesirable rubbery masses or agglomerates of large particles which plug filters. Adjustments made to eliminate these problems generally result in anti-halation layers of inadequate density.

Therefore, it is an object of this invention to provide a process for the preparation of an anti-halation layer containing finely-divided manganese dioxide as the light-absorbing element.

It is still another object of this invention to provide a reliable method for reducing potassium permanganate to manganese dioxide while simultaneously keeping the dioxide pigment uniformly dispersed in a suspending medium.

It has now been discovered that the above objects can be attained by preparing manganese dioxide or pyrolusite through the reduction of potassium permanganate with a hydroxyl-containing, organic, non-polymerizable, compound and preferably a polyol having an oxygen to carbon ratio of greater than 1:2.

While, as pointed out above, alcohol and polyvinyl alcohol have been used as chemical reductants, their defects contra-indicated the use of hydroxy compounds, generally. It is, therefore, completely unexpected that the specific polyols and polyoxyethanols used in the present invention function so admirably and obviate the deficiencies of the prior art compounds. The useful polyols employed in this invention have the general formula R-(OH)$_x$ wherein R is an aliphatic or aromatic radical of $C_2$ to $C_{50}$ and
$x$ is an integer of from 2 to 4, the ratio of oxygen to carbon being greater than 1:2. In order for this ratio to obtain with higher molecular weight compounds e.g. $C_8$ and above, it is necessary to have oxygen present in the aliphatic or araliphatic moiety. Examples of suitable polyols include:

ethylene glycol
1,2 and 1,3 propane diol
1,2,5-pentanetriol
1,2; 1,3 and 1,4 butane diol and other alkane polyols
diethylene glycol
triethylene glycol
tetraethylene glycol
polyoxyethylene diols, triols and tetra-ols Unsaturated aliphatic moieties are aslo suitable; such as the alkylene and acetylenic glycols including 1,4-butyne diol, 1,2; 1,3 and 1,4 butene diol and the ethylene oxide condensates (1–50 moles ethylene oxide) therewith.

As alternatives to the polyols, one may employ as the chemical reductant a surface active oxyalkylated, preferably oxyethylated alcohol or phenol ($C_6$ to $C_{50}$). With such compounds, it is preferred that the oxygen to carbon ratio be at least about 1:5 and preferably 1:4 and higher. Examples of suitable products of this type are octyl alcohol plus 15 ethylene oxide
nonyl alcohol plus 15 ethylene oxide
lauryl alcohol plus 15 ethylene oxide
lauryl alcohol plus 25 ethylene oxide
tetradodecyl alcohol plus 20 ethylene oxide
hexadecyl alcohol plus 30 ethylene oxide
octadecyl alcohol plus 50 ethylene oxide
nonyl phenol plus 10 ethylene oxide
dinonyl phenol plus 10 ethylene oxide
dinonyl phenol plus 20 ethylene oxide In carrying out the process of the present invention to effect the reduction of the permanganate to manganese dioxide, it is preferred to maintain in the system means to provide uniform adequate suspension of the dioxide. Outstanding materials are interpolymers of an ethylenically unsaturated polymerizable monomer with an α,β-unsaturated dicarboxylic acid anhydride such as the vinyl alkyl ether-maleicanhydride interpolymers and preferably a methyl, ethyl, n- and isopropyl and -butyl vinyl ether-maleic anhydride (1:1) interpolymer. The molecular weight of the interpolymer is not critical with those characterized by K values (Fikentscher) of from 10 to 100 being suitable. The Fikentscher K value is described in detail in U.S. Pat. No. 3,328,309 (Grifo) as are reaction products of such interpolymers with reactive-hydrogen containing compounds which reaction products are also outstanding as a suspending medium in the present invention and the disclosure of said U.S. Pat. No. 3,328,309 is hereby incorporated by reference.

The general method for preparing the compositions and anti-halation layers of the present invention includes reducing the permanganate with the selected hydroxy compound while simultaneously suspending the manganese dioxide with the suspending means e.g. methylvinylether-maleic anhydride interpolymer, thereby obtaining a uniform dispersion of the manganese dioxide in the suspending material. The resultant colloidal composition is compatible with gelatin so that a smooth anti-halation layer can be formed on the film base in any suitable manner known to those skilled in the art.

The reaction between the permanganate, the vinyl alkyl-ether maleic annydride interpolymer, and the polyglycol is exothermic. It is preferable to react these ingredients at room temperature and to permit the temperature to rise to a level of 40° to 45°C. This temperature is very close to the coating temperature of gel solutions and thus does not require any further heating — which gives rise to greater efficiencies in the processes of photographic film manufacturing.

The superiority of the reaction product obtained when utilizing the vinyl alkyl-ether maleic anhydride interpolymer in conjunction with the polyglycol is evidenced by the fact that use of the vinyl alkyl-ether maleic anhydride interpolymer suspending agent alone requires very slow reaction at room temperature and results in a product having inferior properties e.g the formation of clumps of reaction product. Even when the temperature of the reaction is raised to 60C, when vinyl alkyl-ether maleic anhydride interpolymer suspending agent alone is utilized, excessive reaction time is required and the product obtained has inadequate density and poor compatibility properties.

The amount of permanganate salt should vary from about 0.5 to 5g. per gram of reductant and preferably from about 1 to 3g. per gram of reductant. The permanganate-reductant reaction product may be used in varying proportions with the gelatin concentration with a generally indicated ratio being 0.2 to 10 parts by weight reaction product per 1 part by weight gelatin and 0.5 to 3.0 parts being preferred.

By varying the aforementioned ratios and concentration one may have careful control and selection of the antihalo density. The latter can, of course, also be controlled by varying the coating thickness, but this is impractical since thickness is normally held constant for ease and economy of manufacture.

A further improvement in the present invention lies in chemically combining the suspending medium and the reductant to form a partial ester as taught and fully described in said aforementioned Grifo U.S. Pat. No. 3,328,309. By the employment of hydroxyl-containing, micelle-forming surface active compounds (preferably $C_8$ to $C_{50}$-amide, alcohol or phenol polyoxyethylated [5–100 moles of ethylene oxide]) it is possible by following the procedure set forth in the Grifo patent to produce partial esters (of the interpolymers described therein) containing 0.01 to 5 percent ester groups. Such partial esters function in an outstanding manner to yield excellent well dispersed, stabilized pyrolusite anti-halo layers.

The following examples will serve to illustrate the present invention without being deemed limitative thereof. Parts are by weight unless otherwise indicated.

EXAMPLE 1

A composition is prepared containing
78.4 parts of 5 percent aqueous potassium permanganate solution
20.0 parts 10 percent aqueous solution of interpolymer (1:1) of methyl vinyl ether with maleic anhydride;
K=20
1.6 parts diethylene glycol The above solution is then added to a coating gelatin solution in a ratio of one part to four parts of a 10 percent aqueous gelatin solution. The resulting mixture is filtered and then coated using conventional techniques on a photographic support to form a thickness sufficient to provide a density of at least 1.5 at 400 millimicrons as measured on a spectrophotometer. The dried coating appears as a dark brown anti-halation layer. Subsequent treatment in photographic processing solutions completely decolorize this coated layer.

EXAMPLE 2

Example 1 is repeated using the following reductants:
A. ethylene glycol
B. triethylene glycol
C. glycerol
D. oleyl alcohol plus 20 moles ethylene oxide
E. eicosyl alcohol plus 50 moles ethylene oxide
F. dinonyl phenol plus 10 moles of ethylene oxide
G. dodecyl phenol plus 30 moles of ethylene oxide
H. 1 percent partial ester of methylvinylether-maleic anhydride interpolymer (1:1) (K=20) with (D) above Comparable excellent results are obtained.

We claim:

1. A process for the preparation of an anti-halation layer which comprises (a) reacting an alkali metal permanganate with a reductant compound of the formula $R\text{-}(OH)_x$
wherein
R is a $C_2$ to $C_8$ aliphatic radical and $x$ is 2 to 4 and when R is $C_6$ to $C_8$ x may also be 1, the ratio of oxygen atoms to carbon atoms being at least 1:2 and where $x$ is 1, the ratio is at least 1:5; (b) thereafter adding gelatin to the reaction product produced in (a).

2. A process as defined in claim 1 wherein said reductant compound is diethylene glycol.

3. A process as defined in claim 1 including in the reaction zone a suspending medium.

4. A process as defined in claim 3 wherein said suspending medium is a methylvinylether-maleic anhydride interpolymer.

5. A process as defined in claim 4 wherein said reductant compound is diethylene glycol.

6. A process as defined in claim 1 wherein
  i. the ratio of permanganate to reductant compound varies from 0.5 to 5 gram, per gram of reductant, and
  ii. the ratio of reaction product to gelatin varies from 0.2 to 10 parts by weight per part of gelatin.

7. A process as defined in claim 4 wherein the reductant is a $C_6$ to $C_8$ polyoxyethylated alcohol.

8. A process as defined in claim 7 wherein said reductant is partially esterified with said interpolymer.

* * * * *